(12) United States Patent
Draluk et al.

(10) Patent No.: US 9,256,758 B2
(45) Date of Patent: Feb. 9, 2016

(54) MODE SENSITIVE ENCRYPTION

(75) Inventors: Vadim Draluk, Cupertino, CA (US);
Francois Goldfain, San Jose, CA (US);
Jan-Willem Maarse, San Jose, CA (US); Geng Chen, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 106 days.

(21) Appl. No.: 13/306,889

(22) Filed: Nov. 29, 2011

(65) Prior Publication Data
US 2013/0138954 A1 May 30, 2013

(51) Int. Cl.
*G06F 21/62* (2013.01)
*H04L 29/06* (2006.01)

(52) U.S. Cl.
CPC .......... *G06F 21/6218* (2013.01); *H04L 63/102* (2013.01); *G06F 2221/2113* (2013.01)

(58) Field of Classification Search
CPC ..... H04L 63/102; H04L 63/10; H04L 63/105; H04L 63/104; H04L 67/306; H04L 67/30; G06F 2221/2113; G06F 2221/2107
USPC ........................................................ 726/1-26
See application file for complete search history.

(56) References Cited

U.S. PATENT DOCUMENTS

| | | | | |
|---|---|---|---|---|
| 7,185,192 B1* | 2/2007 | Kahn | ............................ | 713/155 |
| 7,246,226 B1* | 7/2007 | Bowers et al. | ..................... | 713/1 |
| 8,219,823 B2* | 7/2012 | Carter | ............................ | 713/182 |
| 8,661,531 B2* | 2/2014 | Owen | ................. | H04L 63/0428 713/167 |
| 8,831,567 B2* | 9/2014 | Kim | .................... | G06F 21/6218 455/411 |
| 8,856,950 B2* | 10/2014 | Kim et al. | ........................ | 726/27 |
| 8,868,901 B2* | 10/2014 | Kim et al. | ...................... | 713/100 |
| 8,904,164 B2* | 12/2014 | Ferren | ................ | G02B 13/0065 455/414.1 |
| 8,909,915 B2* | 12/2014 | Ferren | ................ | G02B 13/0065 455/435.1 |
| 8,925,103 B2* | 12/2014 | Kim et al. | ........................ | 726/27 |
| 8,958,828 B2* | 2/2015 | Zheng | ............... | H04M 1/72569 340/313 |
| 8,959,451 B2* | 2/2015 | Bender | ............... | G06F 9/44505 715/764 |
| 2004/0078568 A1* | 4/2004 | Pham et al. | .................... | 713/165 |
| 2005/0268336 A1* | 12/2005 | Finnegan | ........................ | 726/15 |
| 2007/0101434 A1* | 5/2007 | Jevans | ............................ | 726/26 |
| 2007/0107051 A1* | 5/2007 | Carter | ............................ | 726/21 |

(Continued)

OTHER PUBLICATIONS

Canim, Mustafa et al., "Design and Analysis of Querying Encrypted Data in Relational Databases", Department of Computer Science, The University of Texas at Dallas, Retrieved from Internet <http://www.utdallas.edu/~muratk/publications/encdb.pdf>, Accessed on Aug. 27, 2013, 18 pgs.

(Continued)

*Primary Examiner* — Tae Kim
(74) *Attorney, Agent, or Firm* — Kwan & Olynick LLP

(57) ABSTRACT

Mechanisms are provided to implement framework level mode specific file access operations. In a mode such as a work or enterprise mode, read and write accesses are directed to one or more secured locations. File data and metadata may be secured with encryption and/or authentication mechanisms. Conventional mobile solutions provide only for mode encryption distinctions at the application level, e.g. one work application may prevent access to certain data, but a different application may want to allow access to that same data. Various embodiments provide framework level mode sensitive encryption that does not require different, mutually exclusive, or possibly conflicting applications or platforms. A device and associated applications may have access to different data based on a current mode.

20 Claims, 9 Drawing Sheets

(56) References Cited

U.S. PATENT DOCUMENTS

| | | | |
|---|---|---|---|
| 2007/0174909 A1* | 7/2007 | Burchett et al. | 726/18 |
| 2008/0022361 A1* | 1/2008 | Bharadwaj et al. | 726/2 |
| 2008/0134295 A1* | 6/2008 | Bailey et al. | 726/4 |
| 2009/0165145 A1* | 6/2009 | Haapsaari et al. | 726/28 |
| 2009/0193266 A1* | 7/2009 | Gable et al. | 713/193 |
| 2009/0210721 A1* | 8/2009 | Phillips | 713/182 |
| 2010/0319053 A1* | 12/2010 | Gharabally | 726/4 |
| 2013/0125198 A1* | 5/2013 | Ferguson et al. | 726/1 |

OTHER PUBLICATIONS

Scarfone, Karen et al., "Guide to Storage Encryption Technologies for End User Devices", NIST Special Publication 800-111: Recommendations of the National Institute of Standards and Technology, Retrieved from Internet <http://csrc.nist.gov/publications/nistpubs/800-111/SP800-111.pdf>, Nov. 2007, 40 pgs.

\* cited by examiner

MODE SENSITIVE ENCRYPTION

TECHNICAL FIELD

The present disclosure relates to mode sensitive encryption.

DESCRIPTION OF RELATED ART

Conventional mobile device encryption mechanisms provide encryption solutions at an application level. Enterprise grade productivity applications may encrypt particular files and folders, etc. However, these enterprise grade applications are simply applications.

The enterprise grade applications may be downloaded and installed on nearly any mobile device and consequently are severely limited in the amount of security and mode separation they can provide. For example, data storage behavior is not affected by a switch to use of an enterprise grade application, thus creating potential vulnerabilities and gaps in data and application separation models.

Consequently, techniques and mechanisms are provided to enhance mode based encryption.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
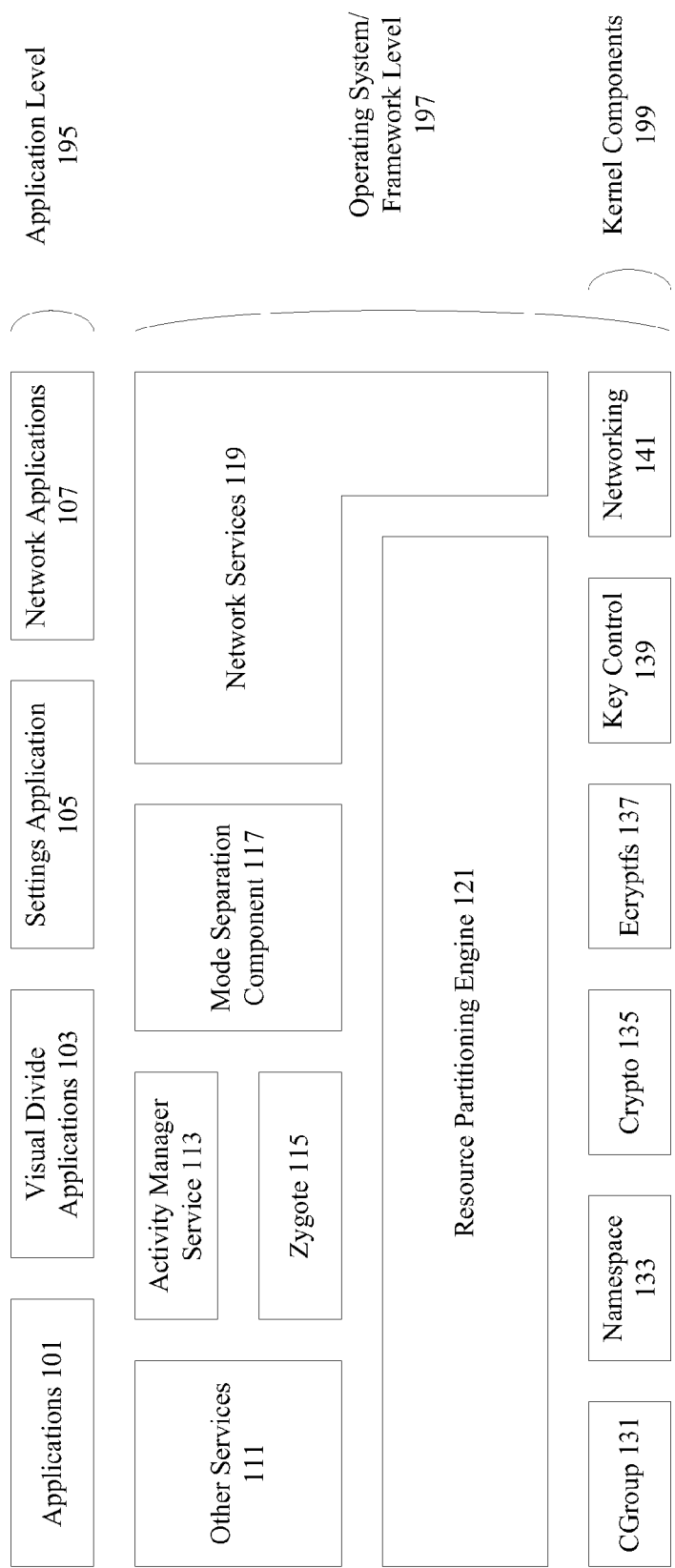
FIG. 1 illustrates a particular example of resource partitioning engine architecture.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular compute nodes and network interfaces. However, it should be noted that the techniques and mechanisms of the present invention apply to a variety of different compute nodes and network interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to implement framework level mode specific file access operations. In a mode such as a work or enterprise mode, read and write accesses are directed to one or more secured locations. File data and metadata may be secured with encryption and/or authentication mechanisms. Conventional mobile solutions provide only for mode encryption distinctions at the application level, e.g. one work application may prevent access to certain data, but a different application may want to allow access to that same data. Various embodiments provide framework level mode sensitive encryption that does not require different, mutually exclusive, or possibly conflicting applications or platforms. A device and associated applications may have access to different data based on a current mode.

Example Embodiments

Mobile device operating systems such as Android™ do not support the concept of multiple modes, and do not support isolation of application groups other than its standard groupings based on identical signatures and declared shared user ID. Some application solutions do support the concept of multiple modes, but because they are merely application suites, they simply sit on top of Android™ and provide primarily visual isolation and do not sufficiently affect application behavior when they run under different modes.

A multiple framework level mode system introduces a much deeper, operating system level classification of processes as belonging to one or more modes, and manages them through mode switches. These separate processes have different views of persistent storage, memory, and networking interfaces, as well as other runtime entities that they are allowed or not allowed to interact with. The multiple framework level mode system controls lifecycle, stopping and launching runtime entities during mode transitions as necessary. This enables applications to run with different configurations and settings depending on the mode their particular runtime instances are associated with, resulting in synchronization using different cloud servers, printing showing different lists of available printers and voice capabilities switching from voice mode under one mode to voice over IP in another mode.

Conventional mobile operating system systems support encryption of internal memory, but not encryption of external memory cards, the components that arguably are in greater need of encryption protection. Activation of encryption functionality results in a large amount of time spent on encrypting everything, and forces a device lock on the user. The encryption does not differentiate between information requiring protection (enterprise and other sensitive data) and information better left in the open for better access and sharing experience (personal photos and media files). This makes full encryption a less than ideal tool for data protection in a multiple mode environment.

Some enterprise grade applications encrypt data at the application level. However, third party application can still write non-encrypted data, and data written to external memory cards may not be encrypted. A multiple framework level mode system facilitates encryption at the file system level. An application's view of a memory card depends on the current module. According to various embodiments, complete data separation between personal and work modes is provided. Data is encrypted and encrypted data can be accessed by an application while in enterprise mode and encrypted data can not be accessed by the same application while in personal mode.

No hard partitioning of any persistent storage is required for such separation, so persistent storage retains the flexibility of a single file system. Third party applications can continue to act seamlessly without requiring any code changes. In particular embodiments, encryption can be entirely software based or may leverage cryptography accelerators or other hardware supported secure environments.

Conventional enterprise grade applications can provide secure network connections between a device and a corporate server. However, a multiple framework level mode system can not simply always use a secured connection. In some instances, it may not be desirable to transmit personal web traffic through a corporate network tunnel. Furthermore, a corporate network may restrict access to particular sites that should be accessible in a personal mode.

According to various embodiments, it is recognized that communication mechanisms should change when a mode switch occurs. However, changing modes should not disrupt or otherwise negatively impact user experience. For example, it may not be desirable for a device communicating over a public Wi-Fi network to suddenly drop a connection due to a mode change. According to various embodiments, a multiple framework level mode system handles network changes in a variety of ways. In particular embodiments, dynamic split tunneling is implemented to transmit packets through or around a virtual private network (VPN) depending on a current mode. This prevents access to sensitive corporate information while a device is in personal mode. Another measure used with the same purpose includes blocking of corporate account access while in a non-work mode.

Behavioral modifications are also called for in case of proxy settings, which could apply to a network when it is used to communicate with a corporate or institutional server, but not when connected to an unsecured network.

Use of a corporate WiFi connection raises yet another set of issues, making any personal use of it undesirable for security reasons. Depending on policy set by an administrator, a multiple framework level mode system either blocks mode transitions when on such a network or maintains an alternative background interface (typically over 3G/4G) used to quickly switch connectivity when transitioning to a different mode.

A variety of enhancements are provided to allow for framework level mode switching. According to various embodiments, the same applications may be used, but the applications may have access to different data, networks, capabilities, and features depending on a current mode. The same device can work for enterprise, personal, club, or family use without compromising security, sharing capabilities, network functionality, the ability to download and use a variety of applications, etc.

FIG. 1 illustrates one example of system supporting multiple framework level modes. According to various embodiments, a resource partitioning engine (RPE) is provided to interact with operating frameworks and services as well as kernel components. In particular embodiments, the RPE interacts with Android™ frameworks and services such as activity manager service 113, zygote 115, network services 119, and other services 111. The RPE also interacts with Linux kernel components cgroup 131, namespace 133, crypto 135, ecryptfs 137, key control 139, and networking 141. According to various embodiments, RPE 121 leverages cgroup kernel module 131 in order to group processes at the system level. RPE 121 uses namespace 133 and ecryptfs 137 to achieve file system separation via cryptography, and Internet Protocol (IP) related networking component 141 to separate access to connected networks.

Various Android™ components, including the activity manager service 113 and zygote 115 are enhanced to provide to provide custom application lifecycle for global applications and to tag application processes with the right running modes at the time they are created. A mode separation service 117 is integrated with visual separation applications 103. The visual separation applications 103 such as Enterproid Divide™ provide event callbacks including those related to mode switching and authentication. In this context, the mode separation service 117 interacts with Android™ services to customize the application lifecycle and with the RPE to unlock resources specific to a particular mode.

Applications such as third party applications 101, 107, visual separation applications 103, and settings applications 105 can include a variety of groups. Personal applications may only be available in personal mode. Enterprise applications may only be available in work mode. Global applications may be available in both personal and work mode. According to various embodiments, some applications can be invoked in personal mode but will switch to a work mode when a pin or other passcode is entered.

Figure 2:
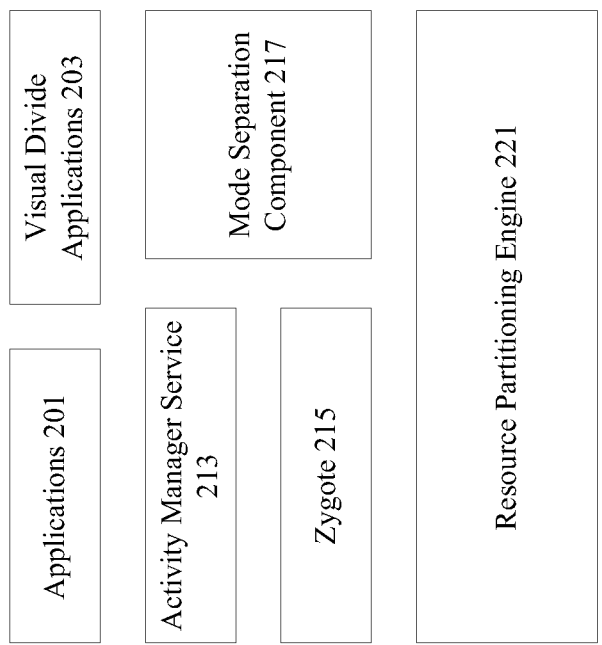
FIG. 2 illustrates a particular example of an application framework.

FIG. 2 illustrates one example of an application framework. Applications such as third party applications 201 and visual separation applications 203 interact with an activity manager service 213. The advicity manager service 213 is a component that resolves the requests to start new applications (activities, services & content providers), requests the creation of new application processes to zygote 215, and keeps track of the running processes during their life times. Zygote refers to an Android™ system process that actually forks itself to create new application processes. Although zygote 215 is specifically described here, it should be noted that various embodiments apply to any process that performs forks to create new application processes. The activity manager service 213 interacts with a mode separation service 217 and RPE 221.

According to various embodiments, when the activity manager service receives a request to launch a new application it checks to make sure that the request is appropriate. For example, an application running on personal mode is not allowed to launch an application in work mode. Similarly, an application running in work mode is not allowed to launch an application in personal mode.

If a requester mode is enterprise, requester package is a work mode visual separation application, or if the package to launch is a work mode visual separation application such as Enterproid Divide™, then work mode is identified. Otherwise, personal mode is identified. It should be noted that although only work mode and personal mode are described in this particular example, a variety of other modes are possible. According to various embodiments, a multiple framework level mode system enhances an activity service manager 213 to tag an application with the appropriate running mode at the time it is launched. Invocation of applications is limited to only applications that belong to the same group. In particular embodiments, all running global applications are terminated when the user swiches mode. Termination occurs because a global application can only run with a single mode at once.

According to various embodiments, the activity manager service 213 sends the running mode it previously identified as part of the request it makes to zygote 215 to fork a new process. It then keeps the running mode as part of the information it maintains for each tracked application process. In particular embodiments, the activity manager service 213 also checks an invoking application trying to bind to a service. After zygote 215 creates a new process for a work or enterprise application process, it passes the pid of the new process to the RPE 221 so that the RPE 221 can group the process appropriately.

When the mode separation service 217 is notified by visual separation applications 203 that the user switches mode, the mode separation service 217 asks the activity manager service 213 to terminate the processes corresponding to global applications, as well as any possible child processes of those application processes (in case some application processes forked manually).

Figure 3:
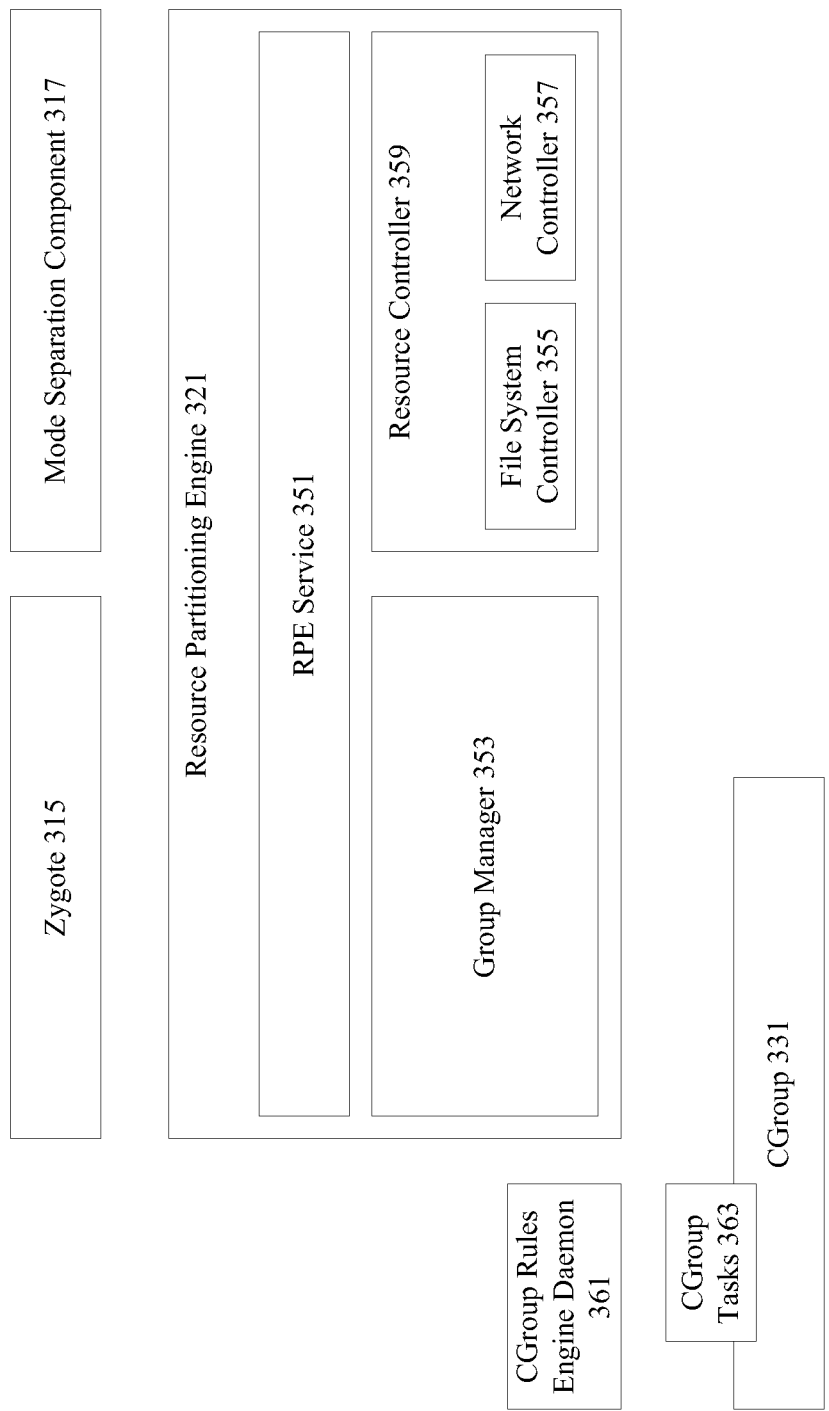
FIG. 3 illustrates a particular example of a resource partitioning engine.

FIG. 3 illustrates one example of a resource partitioning engine (RPE). According to various embodiments, the RPE 321 is a daemon running with system privileges. It is started by an operating system process at the time the device boots. Its initialization is triggered when it is notified by the mode separation component 317 that an enterprise or work mode is enabled. The mode separation component 317 provides this notification after work mode is successfully initiated or enabled. According to various embodiments, the RPE 321 provides a native binder service that is handled by an RPE service subcomponent 351. The RPE service subcomponent 351 dispatches requests to other RPE subcomponents including group manager 353 and resource controller 359. It should be noted that although particular subcomponents are shown, a variety of different subcomponent configurations are possible. According to various embodiments, a group manger 353 groups processes together based on mode. In particular embodiments, when zygote 315 creates a process for an enterprise application, it notifies the RPE 321 through a service interface accessible by zygote for the process to be grouped accordingly by the group manager 353.

In particular embodiments, when the group manager 353 first initializes after a reboot, the group manager 353 creates a new cgroup 331 to group enterprise processes together. It uses the cgroup tasks kernel 363 in order to pass the process identifier (pid) of each process to add to the enterprise cgroup. According to various embodiments, the cgroup rules engine daemon 361 is used if other system daemons need to be added by default to the enterprise cgroup. At this point, no system daemon that would be required to be part of the enterprise cgroup has been identified. According to various embodiments, only the RPE process 321 and the cgroup rules engine daemon are allowed to pass a pid to the cgroup tasks kernel 363.

According to various embodiments, system resource partitioning is performed by resource controller 359. The file system controller 355 partitions a file system such as a secure digital (SD) card memory file system. The network controller 357 restricts access to enterprise networks.

Figure 4:
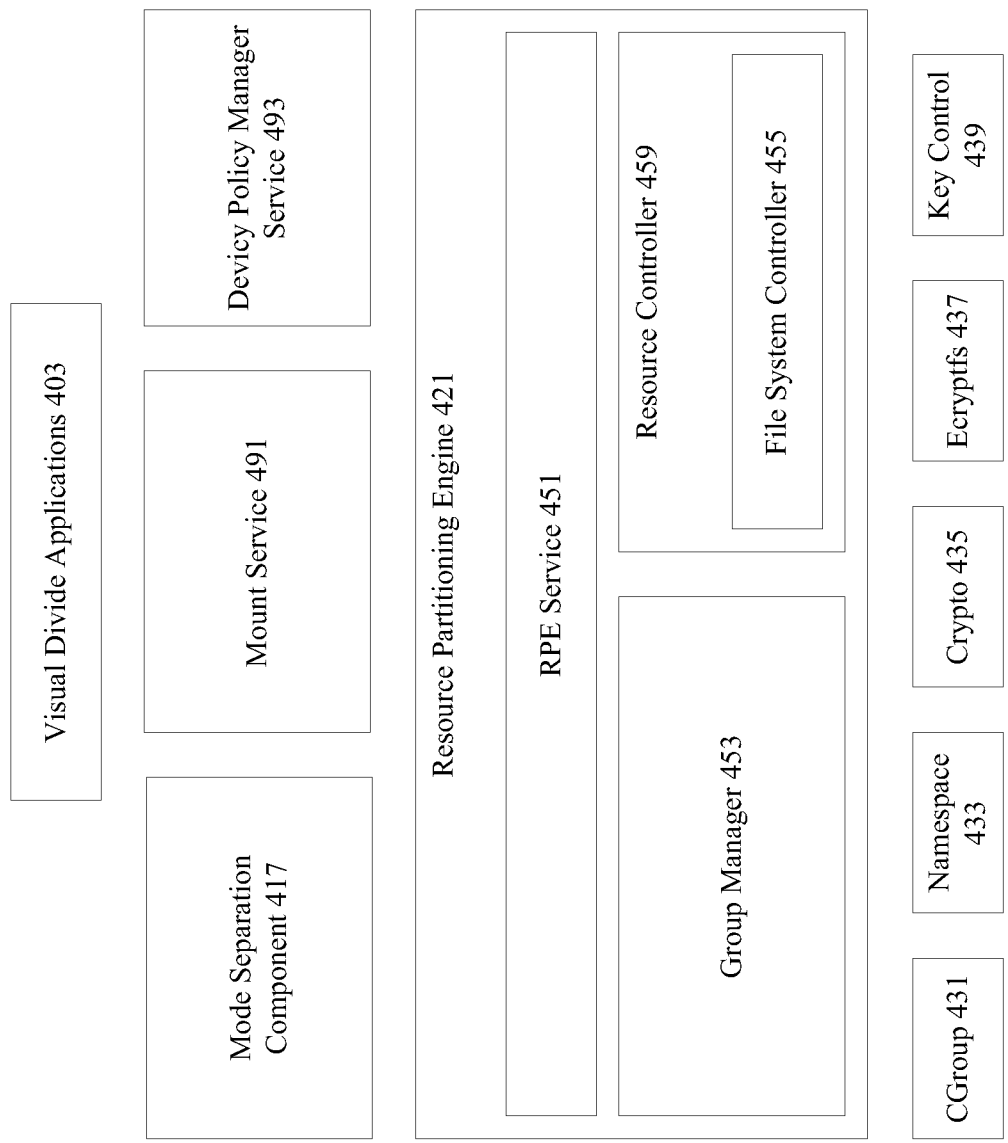
FIG. 4 illustrates a particular example of a resource partitioning engine file system controller.

FIG. 4 illustrates one example of a file system controller. According to various embodiments, a file system controller is configured to partition a file system such as a flash memory card file system. In particular embodiments, the file system controller 455 creates a separate namespace 433 for a work file system and binds it to work cgroup 431, previously created by the group manager 453. The separate namespace is created by mounting the cgroup's name space subsystem 471. The name space subsystem 471 is enhanced so that each time the group manager 453 adds a new process identifier to the cgroup 431, the corresponding process is also added to the namespace 433. With a namespace 433 create, the file system controller 455 in a resource controller 459 of an RPE can set a mount table specific to a work mode.

According to various embodiments, the file system controller 455 creates an enterprise or work folder at the root of a memory card file system. If no work folder is present, it creates one. It then mounts this work folder with an ecryptfs 437 at the location of the memory card mount point: /mnt/sdcard/work->/mnt/sdcard. It should be noted that memory cards may include SD cards, SDHC cards, MicroSD cards, and other persistent memory. With this mount, applications running in work mode seamlessly access the dedicated work folder of the SD card. In addition, all files written by those enterprise or work applications are encrypted (including the file names) and decrypted when read. According to various embodiments, the ecryptfs kernel module 437 uses the crypto module 435 for encrypting the files and gets the crypto key from the key control module 439, based on the signature parameters passed by the file system controller 455 at the time ecryptfs was mounted.

According to various embodiments, when the user first enters the visual divide applications 401 pin after a device reboot, the visual divide applications 401 pass the encryption key to a file system controller 455 by way of a mode separation component 417. In particular embodiments, the key is used as a file encryption key for ecryptfs 437. Using the file encryption key, the file system controller 455 generates a hash used as a signature of the file encryption key. It then inserts the signature and file encryption key pair into the kernel key control module 439.

The signature is the value passed to ecryptfs 437 when it is mounted. In particular embodiments, the visual divide applications 401 are configured to protect the encryption key via user PIN. It should be noted that PIN here is used to refer to PIN numbers, passcodes, passwords, pass sequences, etc.

The file system controller 455 receives notifications from the mount service 491. In particular embodiments, when the memory card is being unmounted, the file system controller 455 unmounts the ecryptfs 437. It also remounts the ecryptfs 437 when notified that the SD card is being remounted. According to various embodiments, the device policy manager service 493 allows for the configuration of policies such as encryption policies for the RPE 421. In some examples, the device policy manager service 493 specifies whether encryption of a memory card is required.

Figure 5:
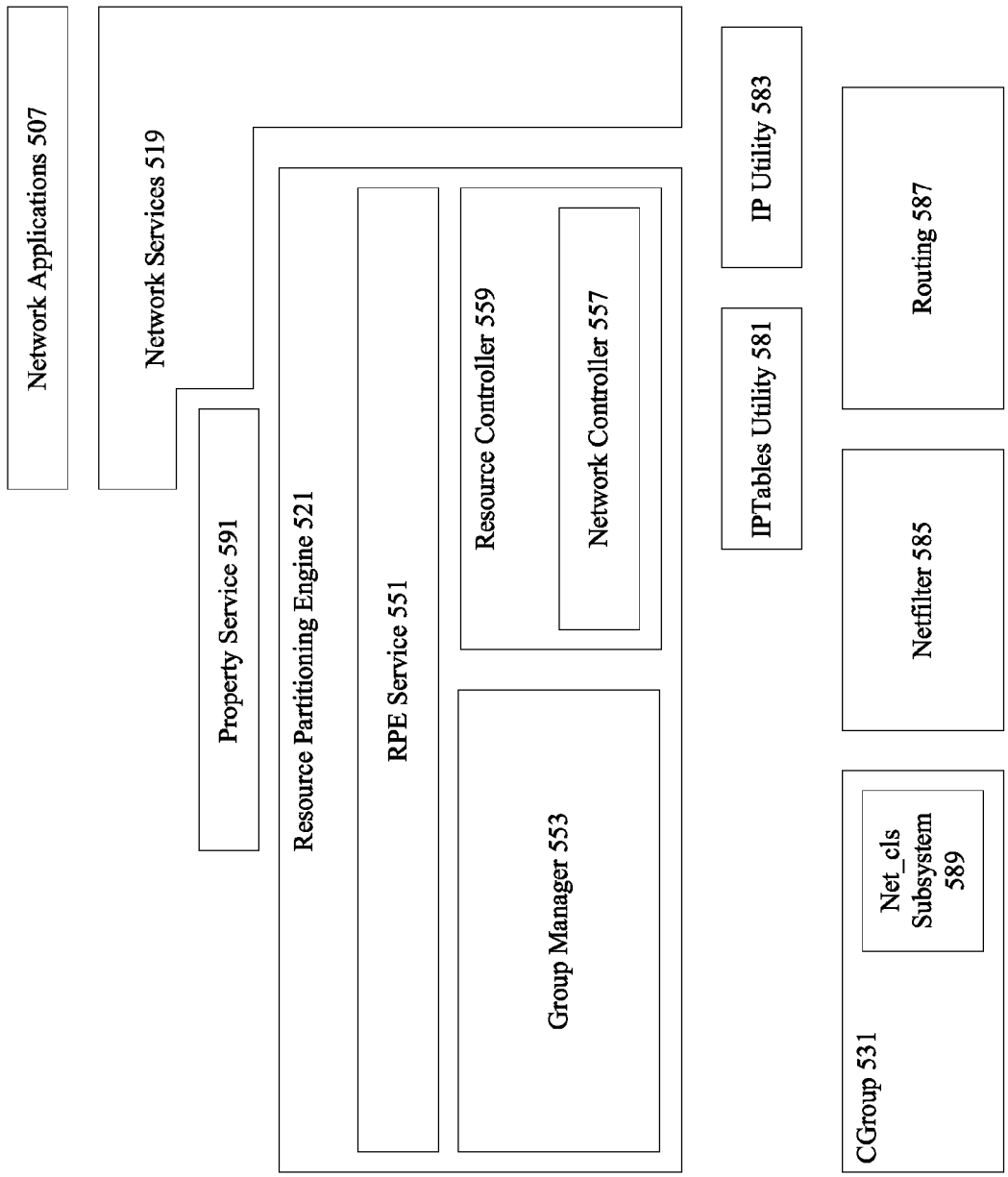
FIG. 5 illustrates a particular example of a resource partitioning engine network controller.

FIG. 5 illustrates one example of a network controller. According to various embodiments, a network controller 557 is an RPE subcomponent configured to limit access to corporate networks to only applications running in an enterprise or work mode. According to various embodiments, different levels of network access are provided to different applications 507 and different network services 519 by leveraging policy routing. Once this feature is configured in a kernel such as a Linux kernel, the network controller 555 can create multiple routing tables. The rules added to this new work routing table are inserted above the rules of the default table. Hence, if no rules are added to the work routing table, its content is the same as the default table. The work routing table is used by the applications running in work mode, while all other applications just use the default routing table.

According to various embodiments, the routing module 587 uses the work routing table when it receives IP packets that have previously been marked by a netfilter module 585. Netfilter is a firewall that can mark packets that follow a set of rules based on identifiers including group identifiers, user identifiers, and process identifiers. In particular embodiments, an iptables utility 581 performs configuration processes and can perform packet marking as follows:

iptables—table mangle—append OUTPUT-m owner—uid-owner jan—j MARK—set-mark 0x1

Enhanced designs of netfilter 585 and iptables 581 allow the creation of non-disruptive extensions and packet marking. In particular embodiments, in order to mark packets based on the running mode of the application, netfilter 585 and the iptables 581 utility have to be extended to support a new filter matching based on a new "owner_routegroup" criteria. The extension is to check the value of the "routegroup" property associated with the cgroup 531 to which current process belongs. With the "owner_routegroup" extension available, the network controller 555 can set up the firewall rules at boot time with a command similar to the following:

iptables—table mangle—append OUTPUT—m owner_routegroup work—j MARK—set-mark 0x1

The group manager 553 provides that work processes are part of the work cgroup 531. In addition to mounting cgroup's "ns subsystem", the RPE also mounts the "net_cls subsystem" 589. The net_cls subsystem 589 is enhanced to include a new "routegroup" custom property, whose value for the work cgroup is set to "work" in/cgroup/net_cls.routegroup. This value is included as part of the net_cls subsystem 589 in the socket structure ("sk_buff") passed to netfilter 585. When netfilter's "owner_routegroup" matching extension finds a match, it marks the packets that are to be routed through the work routing table.

Figure 6:
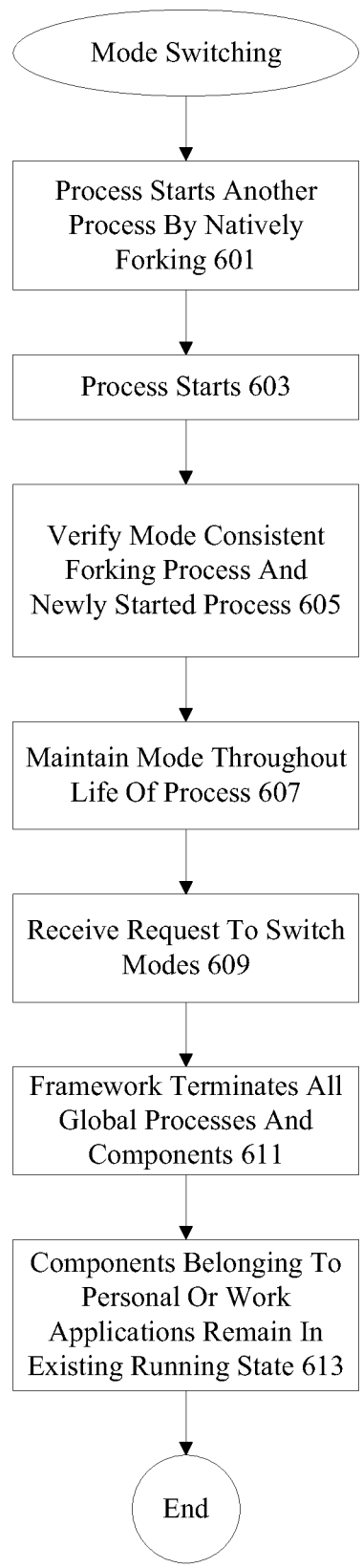
FIG. 6 illustrates a particular example of mode switching.

In Android™, IP addresses of domain name servers (DNS) are provided by property service 591. In order to provide different DNS IPs for processes running in a particular mode, the property_service 591 is enhanced so that it checks the routinggroup of the calling process with the RPE 521. The routing group affects what DNS IPs are obtained FIG. 6 illustrates one example of a technique for launching a process and switching modes. According to various embodiments, a process such as an application process starts another process by natively forking at 601 or by using a framework such as an Android™ framework to start an application at 603. According to various embodiments, a process is an application or a component of an application. At 605, the mode of an process being started is verified to make sure that it in the same mode group as the application starting it. At 607, the mode is maintained throughout the life of the process. At 609, a request to switch modes is received.

The request may be triggered by selection of a mode switching option in a status bar, double tapping a home button, or some other trigger. At 611, all global processors, applications, or components of global applications including activities and services are terminated by the framework. Components that belong to only personal or work applications are allowed to remain in their existing running state 613.

Figure 7:
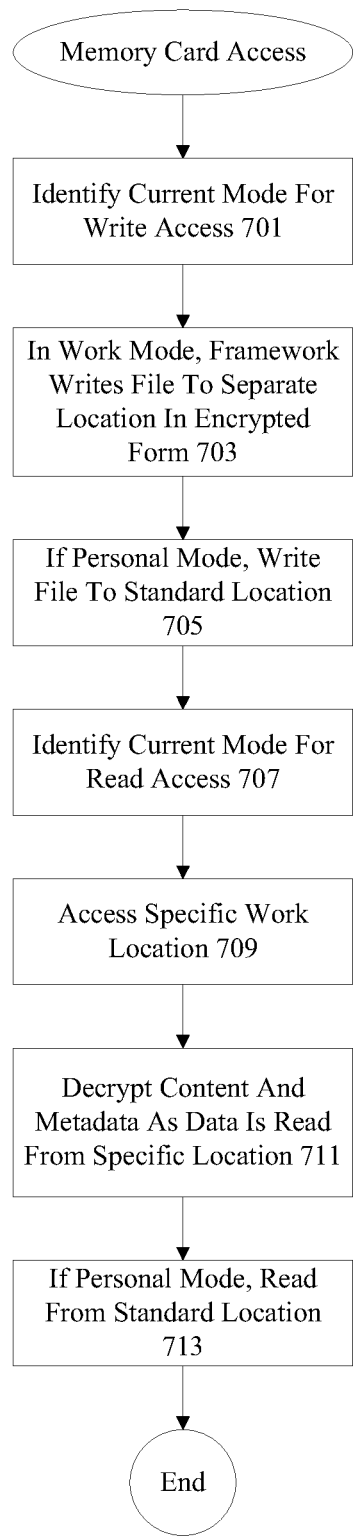
FIG. 7 illustrates a particular example of a mode based memory card access.

FIG. 7 illustrates one example of a technique for writing to a memory card and reading from a memory card. At 701, a current mode is identified. According to various embodiments, if the current mode of a particular application is a work or work mode, a file is written to a separate location at 703 where work or enterprise files are stored. The data written to this separate location may be encrypted. In particular embodiments, this separate location is a separate directory. At 705, if the current mode of a particular application is personal, the file is written in the standard memory card location and is not encrypted. This logic is transparent to the application, which does not have to be modified.

The application can also browse or read from the memory card file system. According to various embodiments, if the application is tagged with a work mode at 707, the work directory or specific work location of a memory card is accessed at 709. The content and metadata of each file are seamlessly decrypted as the application reads them at 711. If the application is assigned to a personal mode, it reads from the standard memory card location where files are not encrypted at 713.

Figure 8:
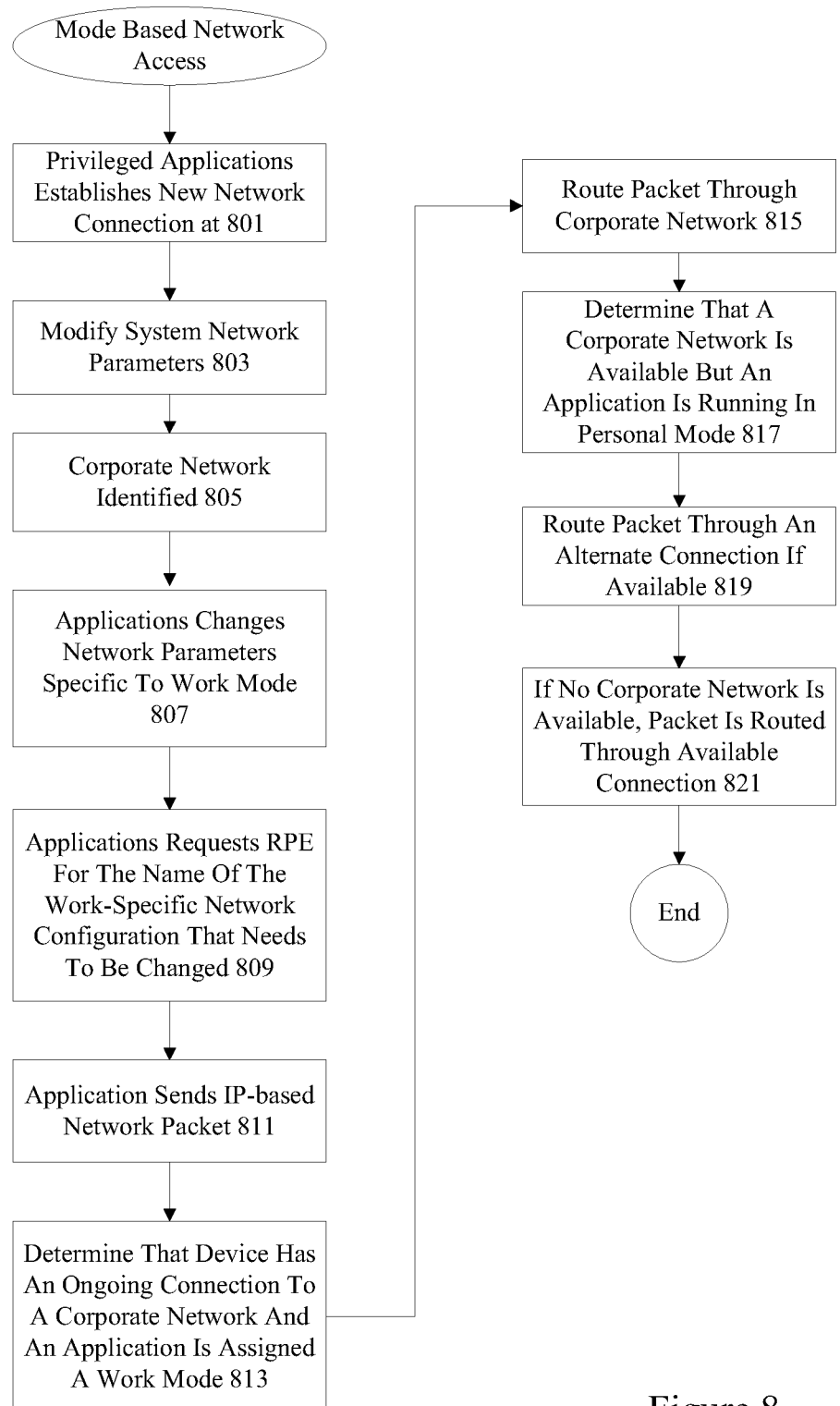
FIG. 8 illustrates a particular example of mode based network access.

FIG. 8 illustrates one example of mode based network access. According to various embodiments, when a privileged application sets up a new network connection at 801, for example by using the settings application or a VPN client application, the system network parameters have to be modified at 803. A corporate network is identified at 805. If the new network connection corresponds to a corporate network, the application changes the network parameters that are specific to the work mode at 807. The application requests the RPE for the name of the work-specific network configuration that needs to be changed at 809.

At 811, an application sends an IP-based network packet. If the devices has an ongoing connection to a corporate network (VPN or corporate Wifi) and the application is assigned the work running mode at 813, the packet is routed through the corporate network at 815. If a corporate network is available but the application is assigned the personal running mode at 817, the packet is routed through an alternate connection if available at 819. If no corporate network is available, the packet is routed through the same shared available connection at 821. When a corporate connection is available, this mechanism essentially provides a split tunneling that is based on the actual running mode of the application and which is seamless.

Figure 9:
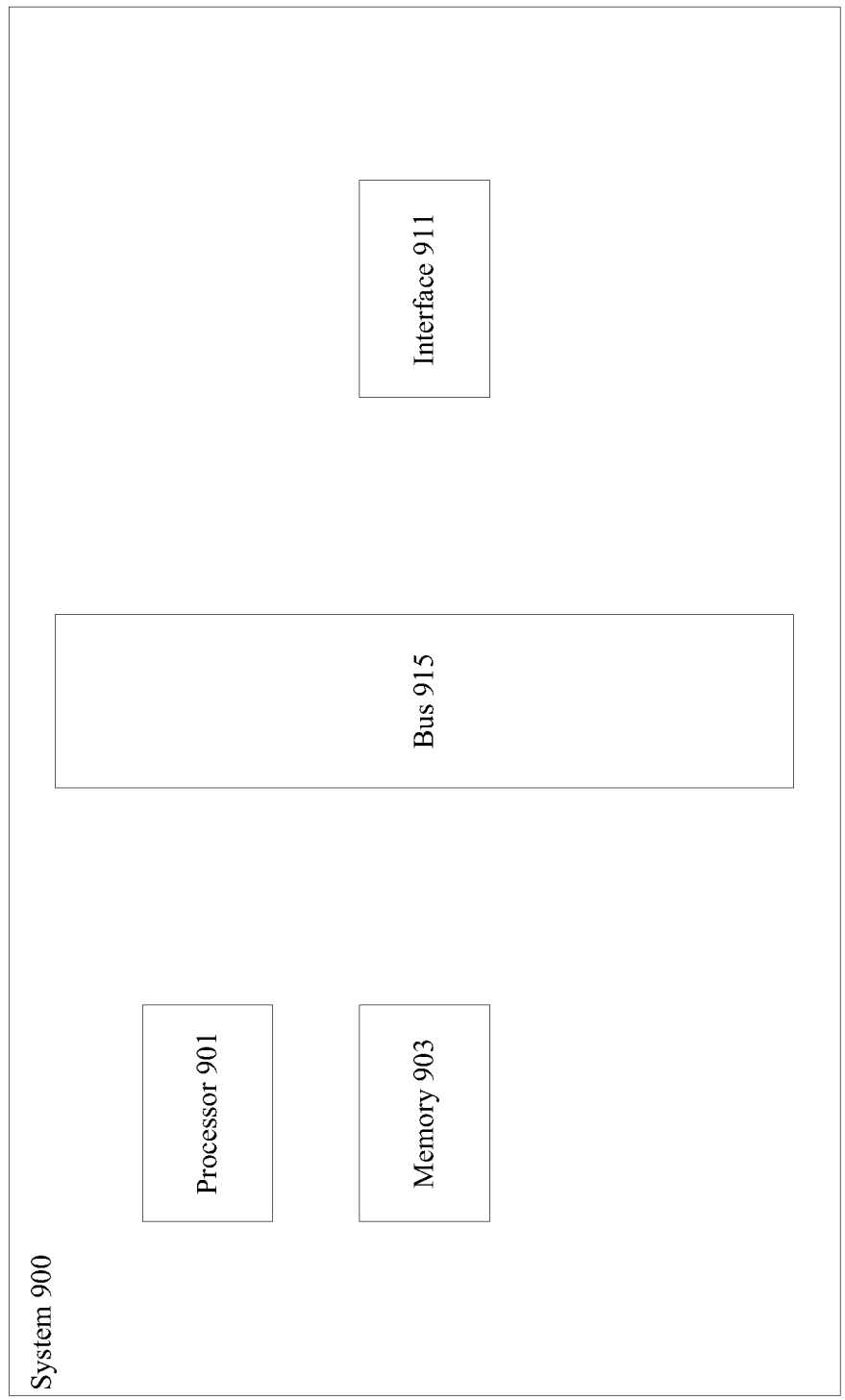
FIG. 9 illustrates a particular example of a computer system.

A variety of devices and applications can implement particular examples of the present invention. FIG. 9 illustrates one example of a computer system. According to particular example embodiments, a system 900 suitable for implementing particular embodiments of the present invention includes a processor 901, a memory 903, an interface 911, and a bus 915 (e.g., a PCI bus). When acting under the control of appropriate software or firmware, the processor 901 is responsible for such tasks such as optimization. Various specially configured devices can also be used in place of a processor 901 or in addition to processor 901. The complete implementation can also be done in custom hardware. The interface 911 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 900 uses memory 903 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   receiving, by a mobile device, a request to launch an application on the mobile device;
   identifying a first mode on the mobile device;
   launching a first application process for the application, by the mobile device, wherein the first application process is assigned to the first mode;
   identifying a first mode network associated with the first mode on the mobile device, wherein the mobile device changes system network parameters specific to the first mode;
   classifying a file write access operation by the application as belonging to the first mode at the operating system level;
   determining a file write access location and an encryption write state based on classifying the file write access operation with the first mode;
   identifying a second mode on the mobile device;
   switching from the first mode to the second mode, comprising:
      terminating, by the mobile device, the first application process and any additional processes assigned to the first mode; and
      launching a second application process for the application, by the mobile device, wherein the second application process is assigned to the second mode;
   classifying a read access operation by the application as belonging to the second mode at the operating system level;
   determining a file read access location and an encryption read state based on classifying the read access operation with the second mode;
   sending, by the application, an Internet Protocol based network packet;
   routing the packet through the first mode network if the first mode network is determined to be available and the mobile device is determined to be in the first mode; and
   routing the packet through an alternative connection if the first mode network is determined to be available and the mobile device is determined to be in the second mode such that transition from the first mode network to the alternative connection is seamless.

2. The method of claim 1, wherein the first mode is a work mode.

3. The method of claim 1, wherein the second mode is a personal mode.

4. The method of claim 3, wherein work mode files are not visible in personal mode.

5. The method of claim 1, wherein the file write access location associated with the first mode is an encrypted directory.

6. The method of claim 1, wherein the file write access location associated with the first mode is a standard location.

7. The method of claim 1, wherein the file read access location associated with the second mode is an encrypted directory.

8. The method of claim 7, wherein files and metadata are maintained in encrypted form in the encrypted directory.

9. The method of claim 8, wherein the file write access location associated with the first mode is a standard location.

10. A system, comprising:
   a mobile device, comprising:
      a hardware processor; and
      memory storing computer readable code which, when executed by the processor, cause the processor to:
         receive a request to launch an application on the mobile device:
         launch a first application process for the application, by the mobile device, wherein the first application process is assigned to the first mode
         identify a first mode on the mobile device;
         identify a first mode network associated with the first mode on the mobile device, wherein the mobile device changes system network parameters specific to the first mode;
         classify a file write access operation by the application as belonging to the first mode at the operating system level;
         determine a file write access location and an encryption write state based on classifying the file write access operation with the first mode;
         identify a second mode on the mobile device;
         switch from the first mode to the second mode, comprising:
            terminate the first application process and any additional processes assigned to the first mode; and
            launch a second application process for the application wherein the second application process is assigned to the second mode;

classify a read access operation by the application as belonging to the second mode at the operating system level;

determine a file read access location and an encryption read state based on classifying the read access operation with the second mode;

send, by the application, an Internet Protocol based network packet;

route the packet through the first mode network if the first mode network is available and the mobile device is in the first mode; and route the packet through an alternative connection if the first mode network is determined to be available and the mobile device is determined to be in the second mode such that transition from the first mode network to the alternative connection is seamless.

11. The system of claim 10, wherein the first mode is a work mode.

12. The system of claim 10, wherein the second mode is a personal mode.

13. The system of claim 12, wherein work mode files are not visible in personal mode.

14. The system of claim 10, wherein the file write access location associated with the first mode is an encrypted directory.

15. The system of claim 10, wherein the file write access location associated with the first mode is a standard location.

16. The system of claim 10, wherein the file read access location associated with the second mode is an encrypted directory.

17. The system of claim 16, wherein files and metadata are maintained in encrypted form in the encrypted directory.

18. The system of claim 17, wherein the file write access location associated with the first mode is a standard location.

19. A non-transitory computer readable medium comprising:

computer code for receiving, by a mobile device, a request to launch an application on the mobile device;

computer code for identifying a first mode on the mobile device;

computer code for launching a first application process for the application, by the mobile device, wherein the first application process is assigned to the first mode;

computer code for identifying a first mode network associated with the first mode on the mobile device, wherein the mobile device changes system network parameters specific to the first mode;

computer code for classifying a file write access operation by the application as belonging to the first mode at the operating system level;

computer code for determining a file write access location and an encryption write state based on classifying the file write access operation with the first mode;

computer code for identifying a second mode on the mobile device;

computer code for switching from the first mode to the second mode, comprising:

computer code for terminating, by the mobile device, the first application process and any additional processes assigned to the first mode; and computer code for launching a second application process for the application, by the mobile device, wherein the second application process is assigned to the second mode;

computer code for classifying a read access operation by the application as belonging to the second mode at the operating system level;

computer code for determining a file read access location and an encryption read state based on classifying the read access operation with the second mode;

computer code for sending, by the application, an Internet Protocol based network packet;

computer code for routing the packet through the first mode network if the first mode network is determined to be available and the mobile device is determined to be in the first mode; and computer code for routing the packet through an alternative connection if the first mode network is determined to be available and the mobile device is determined to be in the second mode such that transition from the first mode network to the alternative connection is seamless.

20. The non-transitory computer readable medium of claim 19, wherein the first mode is a work mode.

* * * * *